(12) United States Patent
Wirth et al.

(10) Patent No.: US 7,793,494 B2
(45) Date of Patent: Sep. 14, 2010

(54) STATIC MIXER AND EXHAUST GAS TREATMENT DEVICE

(75) Inventors: Georg Wirth, Kirchheim/Teck (DE); Felix Neumann, Esslingen (DE)

(73) Assignee: J. Eberspaecher GmbH & Co., KG, Esslingen (DE)

(*) Notice: Subject to any disclaimer, the term of this patent is extended or adjusted under 35 U.S.C. 154(b) by 923 days.

(21) Appl. No.: 11/604,957

(22) Filed: Nov. 28, 2006

(65) Prior Publication Data

US 2007/0204751 A1 Sep. 6, 2007

(30) Foreign Application Priority Data

Mar. 2, 2006 (DE) .................. 10 2006 009 676
May 27, 2006 (DE) .................. 10 2006 024 778

(51) Int. Cl.
*F01N 1/00* (2006.01)
(52) U.S. Cl. .................. 60/324; 60/289; 60/282; 60/274
(58) Field of Classification Search ............ 60/282, 60/286, 295, 296, 301, 303, 324, 274, 289; 366/336, 337, 338, 340, 341
See application file for complete search history.

(56) References Cited

U.S. PATENT DOCUMENTS

| 4,530,418 A | 7/1985 | Currie |
| 4,824,614 A * | 4/1989 | Jones .................. 261/76 |
| 5,435,976 A | 7/1995 | Berner et al. |
| RE36,969 E | 11/2000 | Streiff et al. |
| 6,401,800 B1 | 6/2002 | Hoffmann et al. |
| 2002/0108368 A1 | 8/2002 | Hodgson |
| 2003/0072694 A1 | 4/2003 | Hodgson et al. |

FOREIGN PATENT DOCUMENTS

| DE | 161209 A1 | 6/1985 |
| DE | 4109305 A1 | 9/1992 |
| DE | 4123161 A1 | 1/1993 |
| DE | 0894523 A1 * | 2/1999 |
| DE | 19741199 C2 | 10/2000 |
| DE | 10020170 C1 | 9/2001 |
| DE | 4313393 C2 | 6/2003 |
| DE | 19938854 C5 | 12/2006 |
| EP | 0894523 B1 | 7/1997 |
| EP | 1371824 A1 | 6/2002 |
| WO | 2005064131 A1 | 7/2005 |
| WO | 2005075837 A1 | 8/2005 |

* cited by examiner

*Primary Examiner*—Thomas E Denion
*Assistant Examiner*—Jesse Bogue
(74) *Attorney, Agent, or Firm*—Howard IP Law Group, PC

(57) ABSTRACT

The invention relates to a static mixer for an exhaust system of an internal combustion engine. The mixer has a wall structure that is arranged across the directional of flow in a pipe and has several layers of a corrugated sheeting material laying across one another in the direction of flow. The cells through which the flow can pass in the direction of flow are provided between the sheeting material of neighboring layers. The sheeting material has baffles for all or several of the cells. The baffles are arranged on the sheeting material so that they are arranged on their outgoing flow side in the case of said cells and extend in the direction of flow and across it.

25 Claims, 9 Drawing Sheets

STATIC MIXER AND EXHAUST GAS TREATMENT DEVICE

FIELD OF THE INVENTION

The present invention relates to a static mixer for an exhaust system of an internal combustion engine. The invention also relates to an exhaust gas treatment device for an exhaust system of an internal combustion engine equipped with such a mixer.

BACKGROUND OF THE INVENTION

In internal combustion engines, mixers of the aforementioned type may be used in their exhaust system, for example, if a gas or a liquid is to be admixed with the exhaust gas. The mixing should be especially intense so as to be able to produce the most homogeneous possible gas mixture and/or to achieve effective evaporation of the liquid introduced and to achieve thorough mixing of the vaporized liquid with the exhaust gas. At the same time, the mixer should not produce an excessively great pressure increase in the exhaust system. Since static mixers work with deflection of flow, they necessarily result in a certain increase in pressure. Therefore, there has been a demand for effective mixers that have only a comparatively low flow resistance. Furthermore, another factor to be taken into account for applications in motor vehicles is that usually there is only a small installation space for accommodating such a mixer in the exhaust systems used there.

In the prior art, EP 1 371 824 A1 discloses that mixing elements may be arranged in an exhaust channel of an exhaust system with the help of which a reactant that is used for selective catalytic reduction of nitrogen oxides in a downstream SCR catalytic converter may be mixed with the exhaust gas. The mixing elements may be designed as baffle elements.

Prior art reference DE 197 41 199 A1 discloses that an expanded metal mesh may be used as a static mixer in a flow channel of an exhaust gas purification system, so that an extremely short mixing zone can be achieved.

Reference DE 43 13 393 A1 discloses another static mixer which may be used upstream from a DeNO$_x$ catalyst of an exhaust system. The known mixer has a frame structure arranged in an exhaust-carrying channel of the exhaust system and having several carriers running across the direction of flow, several planar trapezoidal baffles of the carriers protruding into and across the flow direction.

Reference DE 41 09 305 A1 discloses a device for introducing a reactant into a gas stream having multiple outlet openings through which the reactant emerges in the opposite direction from the flow. Each outlet opening is assigned a mixing element on the outgoing flow side to create turbulence in the reactant with the exhaust stream.

SUMMARY OF THE INVENTION

According to an aspect of the invention, there is provided a mixer and an exhaust gas treatment device having an inexpensive design and a comparatively intense mixing effect and/or vaporization effect with a comparatively low flow resistance.

The invention is based on the general idea of implementing the mixer with the help of a corrugated sheeting of material that is stacked in several layers across the direction of flow such that cells through which the flow can pass in the direct flow direction are formed between neighboring layers. The sheeting material is equipped with baffles that are arranged with an inclination with respect to the direction of flow on the outgoing flow end of several cells, preferably all cells. The corrugated sheeting material can be manufactured especially inexpensively. At the same time, the mixers have a simple design so that the mixer can be implemented inexpensively. In addition, the individual cells with the baffles assigned in a predetermined manner ensure a targeted and thus intense vaporization effect and/or mixing effect. At the same time the pressure drop in flow through this mixer can be kept comparatively small due to the selected design with the flow-carrying cells. Finally, this mixer has a relatively short design in the direction of flow.

In an exemplary embodiment, the corrugated form of the sheeting material is uniformly selected so that the corrugations that occur have the same wavelength and the same amplitude. This simplifies inexpensive production of the sheeting material.

In another embodiment, the sheeting material is arranged so that it is offset by one half wavelength across the direction of flow in each layer in comparison with the sheeting material of the next neighboring layer. Subsequently, the hills of the corrugations of one layer are in contact with the valleys of the corrugations of the neighboring layer, whereby the cells are formed between these contact points. In this configuration, the cells have maximum flow cross sections, which is advantageous with regard to a low flow resistance.

In another exemplary embodiment, the corrugations of the sheeting material are sinusoidal, so that the sheeting material which is arranged layer by layer has a particularly high flexibility across the direction of flow. This presupposes the use of a suitably flexible material. In applications in exhaust systems, steels, especially stainless steels, may be used. Likewise, the corrugations of the sheeting materials may be rectangular, which makes it possible to implement cells having a rectangular cross section. Likewise, trapezoidal wave structures may also have a hexagonal and/or honeycomb cross section.

Yet another embodiment has the sheeting material which extends without interruption over at least two neighboring layers, and may also extend over all layers. The sheeting material is then folded or bent over into the neighboring layer on the lateral ends of the respective layer. A wall structure constructed with the help of the layered sheeting material can thus be manufactured from just a single component, so that production of this wall structure and therefore of the mixer is extremely inexpensive. In particular it is not necessary to attach the sheeting material separately to the pipe or to a ring encompassing the wall structure in the circumferential direction in each layer.

According to another embodiment, the baffles may be shaped integrally on the sheeting material in particular, dimensioned and oriented with respect to the direction of flow so that they seal and/or overlap the cells in the direction of flow at least 80% or at least 90% or at least 95% or 100% in a completely lightproof manner. Due to this design, it is possible to achieve an intense mixing and/or complete evaporation. For example, this ensures that liquid droplets sprayed upstream from the mixer will strike the baffles with a very high probability and thus cannot flow through the mixer unhindered. As soon as the liquid adheres to the baffles, it is exposed to the exhaust flow and its vaporizing effect.

It is self-evident that the features mentioned above and those yet to be explained below may be used not only in the particular combination given but also in other combinations or alone without going beyond the scope of the present invention.

BRIEF DESCRIPTION OF THE DRAWINGS

Preferred exemplary embodiments of the invention are depicted in the drawings and explained in greater detail in the following description, where the same reference numerals are used to refer to the same or similar or functionally identical components.

DETAILED DESCRIPTION OF THE INVENTION

Figure 1A:
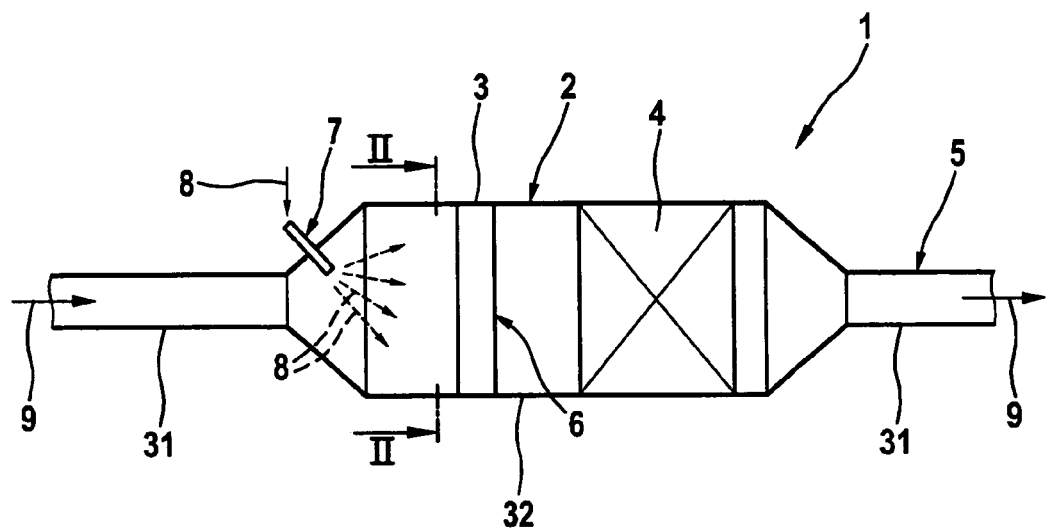
FIG. 1a is a simplified basic sectional view of an exhaust treatment device.

Referring to FIG. 1a, an exhaust gas treatment device 1 has a housing 2 with a tubular body 32 that forms a jacket of the housing 2. At least one exhaust gas treatment insert 4 is arranged in the tubular body 32. The exhaust gas treatment device 1 is tied into an exhaust system 5 of an internal combustion engine (not shown). The exhaust gas treatment device 1 may be a muffler, a particulate filter, a catalytic converter or any desired combination of the aforementioned devices. Accordingly, the exhaust gas treatment insert 4 may be, for example, a catalytic converter element or a particulate filter element. Likewise, it may be a muffler arrangement.

Upstream from the exhaust gas treatment insert 4 a static mixer 6 is installed in the tubular body 32 and is explained in greater detail below with reference to FIGS. 2 through 9. With the help of a spray nozzle 7 arranged upstream from the mixer 6, a liquid, represented by arrows 8, can be sprayed into the exhaust gas flow, represented by arrows 9, upstream from the mixer 6. In the case of an SCR catalytic converter, the liquid 8 sprayed into the exhaust may be ammonia or an aqueous urea solution. In the case of a particulate filter having an integrated or upstream oxidation catalytic converter, the liquid sprayed into the exhaust may be liquid fuel.

The mixer 6 in the exhaust system 5 and/or in the exhaust gas treatment device 1 serves to evaporate the liquid 8 sprayed into the device as extensively as possible and to mix it with the exhaust flow as thoroughly as possible to produce the most homogeneous possible fluid vapor-exhaust gas mixture downstream from the mixer 6 in this way. At the same time, the mixer 6 should have the most compact possible design to allow it to be integrated easily into such an exhaust gas treatment device 1 and/or exhaust system 5. In addition it is desirable for the mixer 6 to have the lowest possible flow resistance so as to minimize the exhaust gas backpressure in the exhaust system 5.

The exhaust system 5 has an exhaust line 31 to which the exhaust gas treatment device 1 is connected. In the embodiment illustrated in FIG. 1b the mixer 6 is situated in this exhaust line 31 namely upstream from the exhaust gas treatment device 1. The spray device 7 is in turn arranged upstream from the mixer 6 and is thus also mounted on the exhaust line 31. This embodiment thus allows the use of a traditional exhaust gas treatment device 1 because the improved mixture is already produced upstream within the exhaust line 31 with the help of the mixer 6.

Figure 1B:
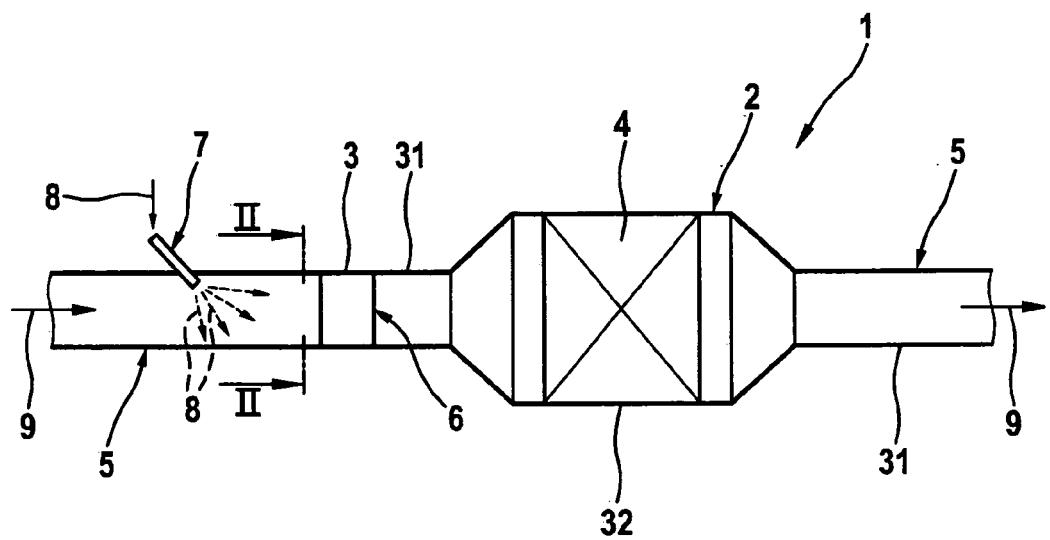
FIG. 1b is a simplified basic sectional view of an exhaust system.
Figure 2:
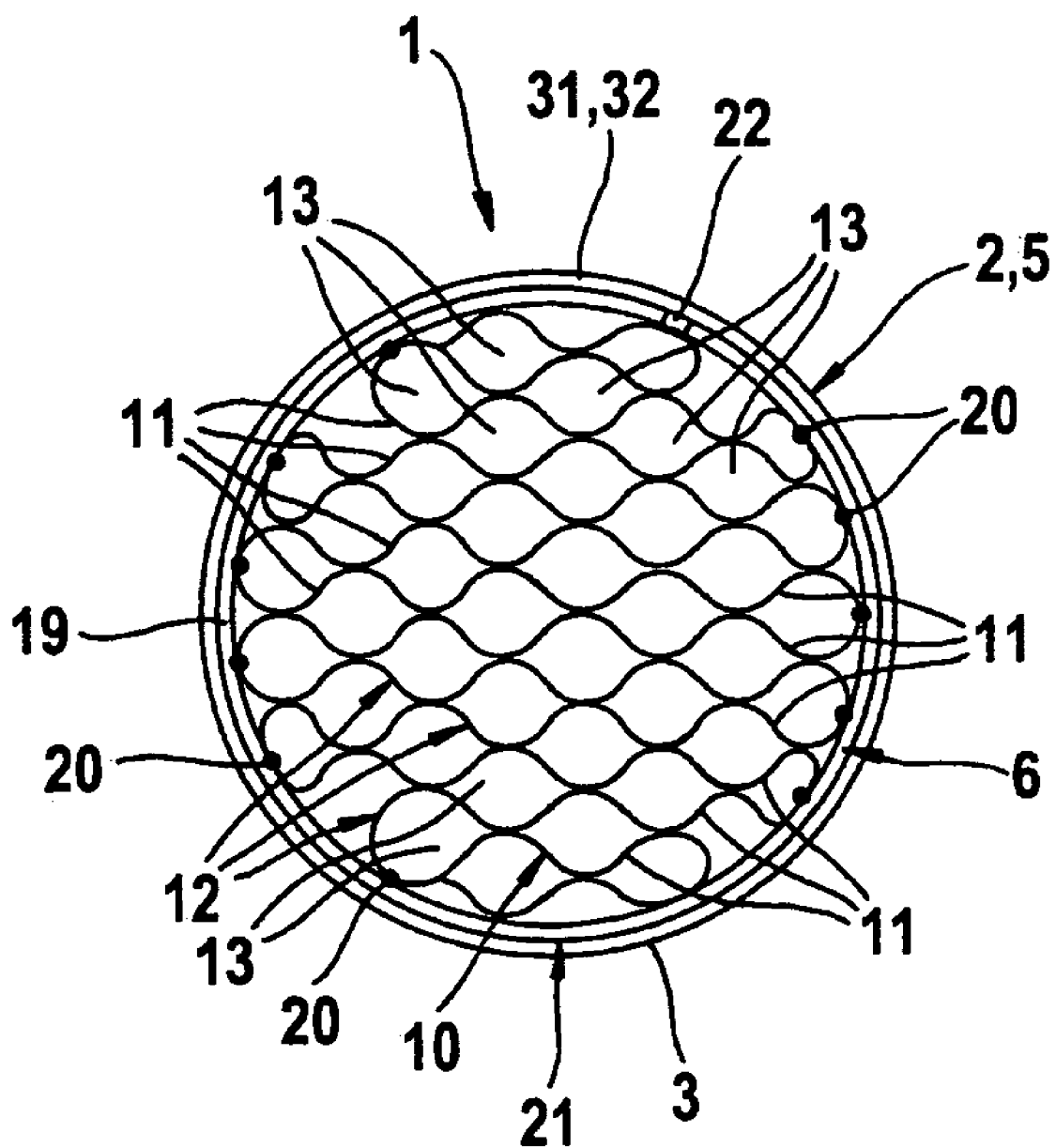
FIG. 2 is a cross section through the exhaust gas treatment device and/or the exhaust system according to sectional lines II in FIGS. 1a and/or 1b.

According to FIG. 2, the static mixer 6 has a wall structure 10 which is arranged across the direction of flow in the tubular body 32 (FIG. 1a) and/or in the exhaust line 31 (FIG. 1b). For the mixer 6 and/or for its wall structure 10, the tubular body 32 and/or the exhaust line 31 each forms a pipe 3 into which the wall structure 10 is inserted. When reference is made to the pipe 3 below, it thus refers to both the tubular 32 according to FIG. 1a as well as the exhaust line 31 according to FIG. 1b. The pipe 3, i.e., the tubular body 32 and/or the exhaust line 31 may have a fundamentally different cross section, depending on the particular installation situation. For example, circular, elliptical and rectangular cross sections are feasible.

The wall structure 10 is of such dimensions that it essentially fills up the cross section of the pipe 3. The wall structure 10 is composed of several layers 11 of a corrugated sheeting material 12. The individual layers 11 extend across the direction of flow and lie on top of one another across the direction of flow as well as across their own longitudinal direction. The sheeting material 12 here is arranged in the individual layers 11 so that a plurality of cells 13 may be provided between the neighboring layers 11 next to the sheeting material 12, each cell allowing flow to pass through it in the direction of flow.

According FIGS. 3 through 8, the sheeting material 12 has one baffle 14 for multiple cells 13, preferably for all cells 13. These baffles 14 are arranged on the sheeting material 12 in such a way that they are arranged on the outgoing flow side of the cells 13 described above. Then the baffles 14 extend in the direction of flow and also across the direction of flow, i.e., the baffles 14 are arranged so that they are opposite the direction of flow.

The sheeting material 12 may be manufactured with the uniform corrugations 15 (see FIG. 4) in all layers 11, so that they have the same wavelengths 16 (see FIG. 4) and the same amplitudes 17 (see FIG. 4) in particular. Therefore, the same sheeting material 12 may be used to manufacture all layers 11. In addition, the wall structure 10 is expediently produced by arranging the sheeting material 12 so that it is offset by one half wavelength 16 across the direction of flow of neighboring layers 11. Subsequently, the hills and valleys of the corrugations of neighboring layers 11 of the sheeting material 12 come in contact at contact points 18 (see FIGS. 3, 4 and 7). This results in a uniform arrangement, in particular a symmetrical arrangement, of the cells 13 within the wall structure 10. In the embodiments shown here, the sheeting material 12 is sinusoidal, i.e., with sinusoidal corrugations. The individual cells 13 therefore have an essentially circular cross section. In other embodiments, the corrugations 15 of the sheeting material 12 may be rectangular or trapezoidal so that rectangular and/or hexagonal or honeycomb cross sections can be produced for the individual cells 13.

Figure 7:
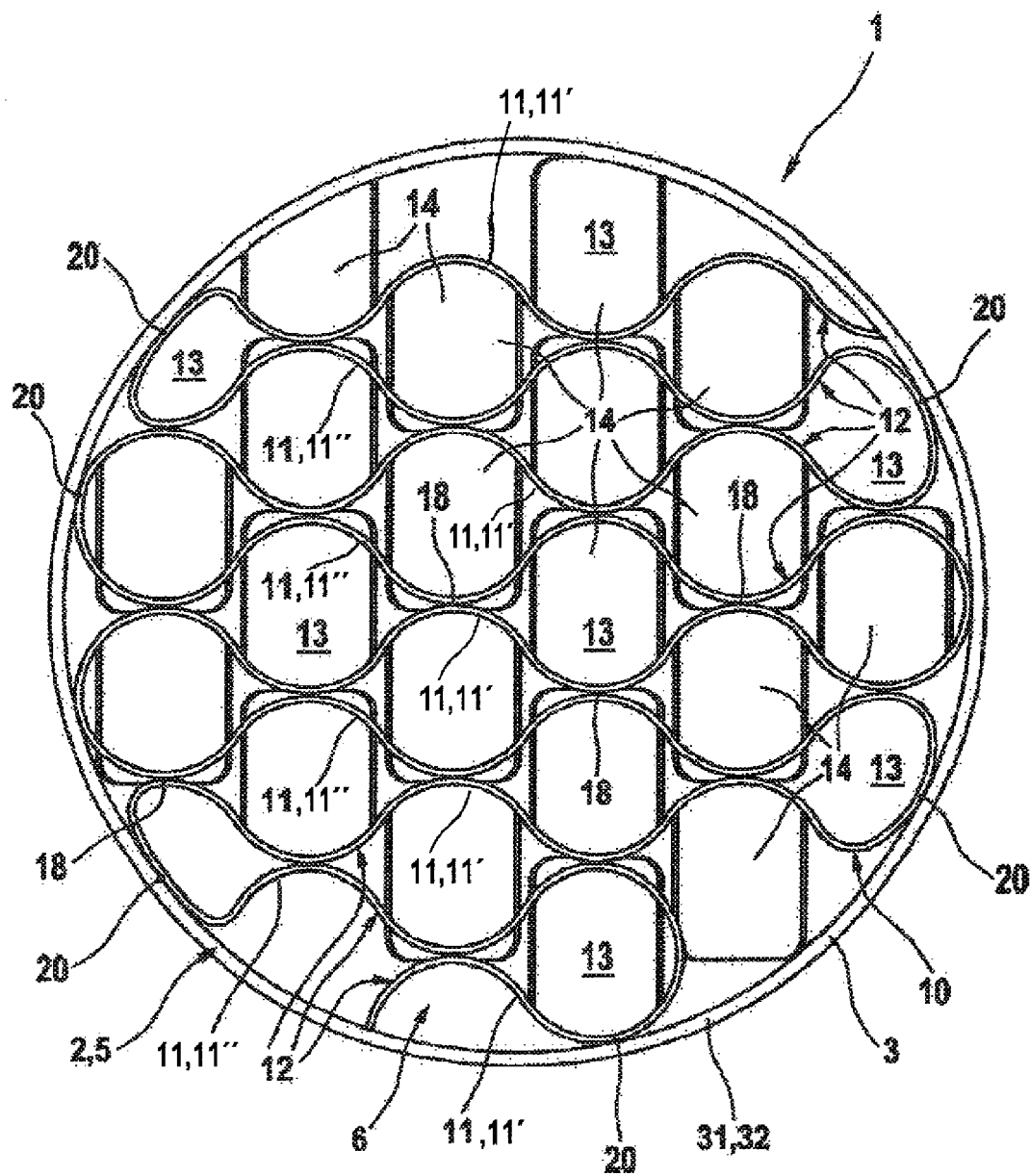
FIG. 7 is a cross-sectional view of another embodiment.

It is also possible to use a separate piece of sheeting material 12 for each layer 11. However, in an embodiment in which the sheeting material 12 extends without interruption over at least two neighboring layers 11, the sheeting material 12 is bent or folded over into the respective next neighboring layer 11 on the lateral end of at least one layer 11. The sheeting material 12 may extend without interruption, i.e., in one piece over all layers 11, as illustrated in FIG. 2 and FIG. 7, for example. On the lateral end of each layer 11, the sheeting material 12 is then bent and/or folded over to the next neighboring layer 11.

In the embodiment illustrated in FIG. 2, the sheeting material 12 and/or the wall structure 10 is encompassed by a ring 19 in the circumferential direction. The sheeting material 12 is attached to this ring 19. For example, individual fastening points 20 may be produced here, e.g., by welded points. The fastening points 20, i.e., the welded spots may be distributed so that the sheeting material 12 is connected to the ring 19 in all layers 11, at least on a lateral end of the respective layer 11. In the case of a continuous one-piece sheeting material 12, it may be expedient in the case of neighboring layers 11 to provide the fastening points 20 alternately on one end and on the other end. The fastening points 20 may also be formed by solder points.

The wall structure 10, i.e., the sheeting material 12 together with the ring 19 forms a unit which can be completely preassembled and inserted into the pipe 3 in the preassembled state. To simplify the insertion of this unit 21 into the pipe 3, the ring 19 may be slotted, e.g., at 22. For insertion into the pipe 3, the ring 19 can be compressed. At the same time, a radial tension may be introduced into the ring 19 via the sheeting material 12, said tension then attempting to widen the ring 19. Subsequently, the ring 19 and thus the unit 21 can compensate for the manufacturing tolerances. In the installed state, the ring 19 is mounted on the pipe 3 and/or on the tubular body 3 of the exhaust gas treatment device 1 in a suitable manner, e.g., by axial contact with a step and/or by welding spots or soldered spots.

In addition, according to FIG. 7, it is also possible to insert the wall structure 10 and/or the sheeting material 12 directly into the pipe 3 without the ring 19. The sheeting material 12 is then attached directly to the pipe 3. The arrangement of the fastening points 20 is then expediently accomplished by analogy with their distribution along the ring 19. The sheeting material 12 attached to the pipe 3, e.g., again via welded spots or soldered spots.

When using a continuous one-piece sheeting material 12 for implementation of all layers 11 of the wall structure 10 in which the baffles 14 are also integrally shaped on the sheeting material 12, the complete mixer 6 may also be manufactured from only a single component, namely from the sheeting material 12. If the ring 19 is optionally also provided, then the unit 21 may optionally consist only of these two components. This makes the manufacture of the mixer 6 comparatively inexpensive.

An embodiment in which the sheeting material 12 lies loosely in contact with neighboring layers 11 between the lateral ends of the individual layers 11 in which the sheeting material 12 of the two layers 11 may be attached to one another and/or to the pipe 3 and/or to the ring 19. In other words, there is no fixed connection between the individual layers 11 of the sheeting material 12 at the contact points 18. Due to this design, relative movements between the sheeting material 12 of neighboring layers 11 are possible in particular, which permits a stress-free reaction of the wall structure 10 to changes in temperature, even in thermal shock, in particular. At the same time resonant vibrations may be dampened by friction.

According to FIGS. 3 through 5, 7 through 9, the baffles 14 may be arranged regularly along the sheeting material 12 in the advantageous embodiments illustrated here, namely in such a way that a repeating structure is formed within the sheeting material 12. In the exemplary embodiments selected here, the individual baffles 14 which protrude along the sheeting material 12 of successive orientations opposite one another with regard to the direction of flow.

Figure 3:
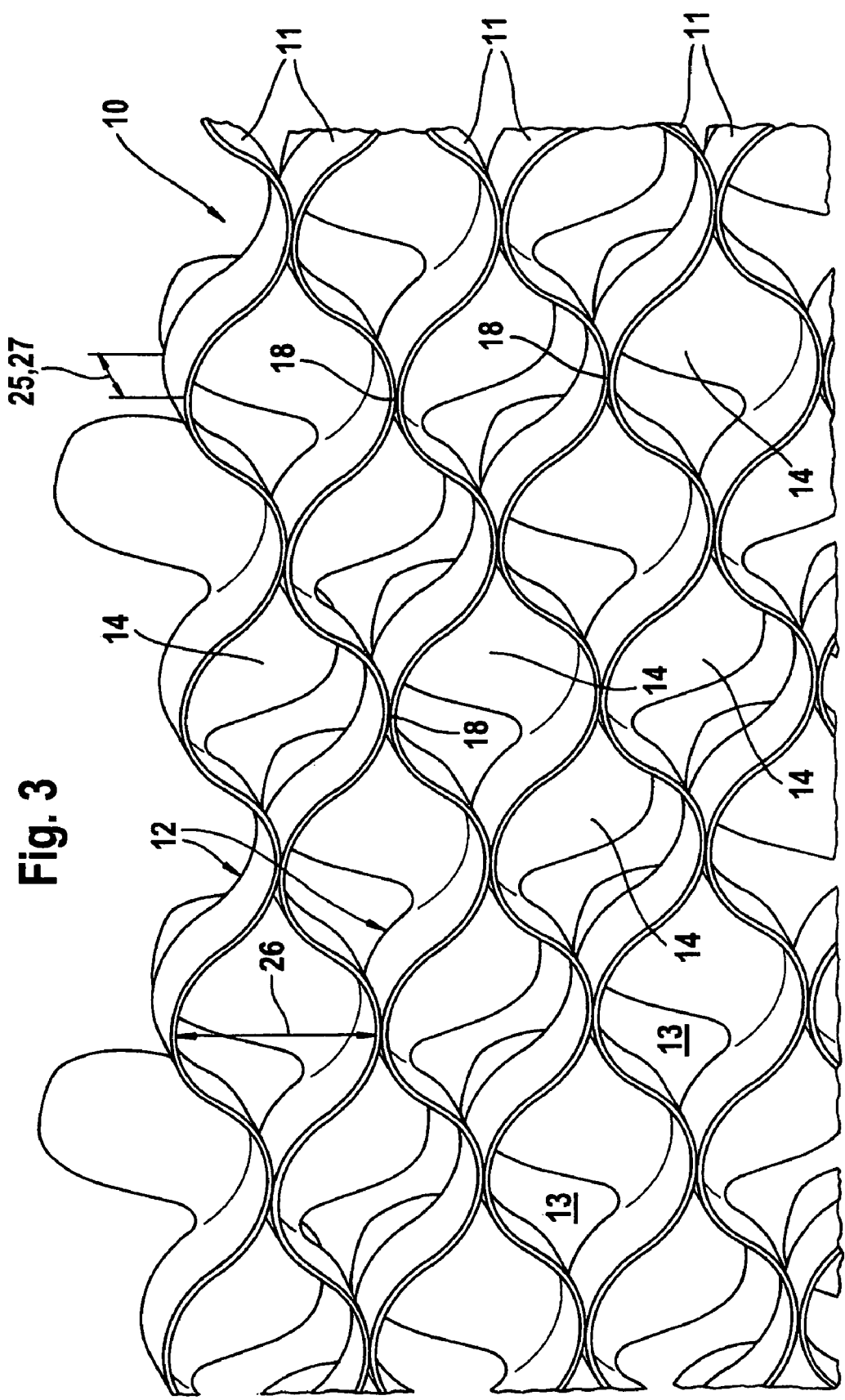
FIG. 3 is an enlarged prospective detailed view of an oncoming flow side of a mixer.
Figure 4:
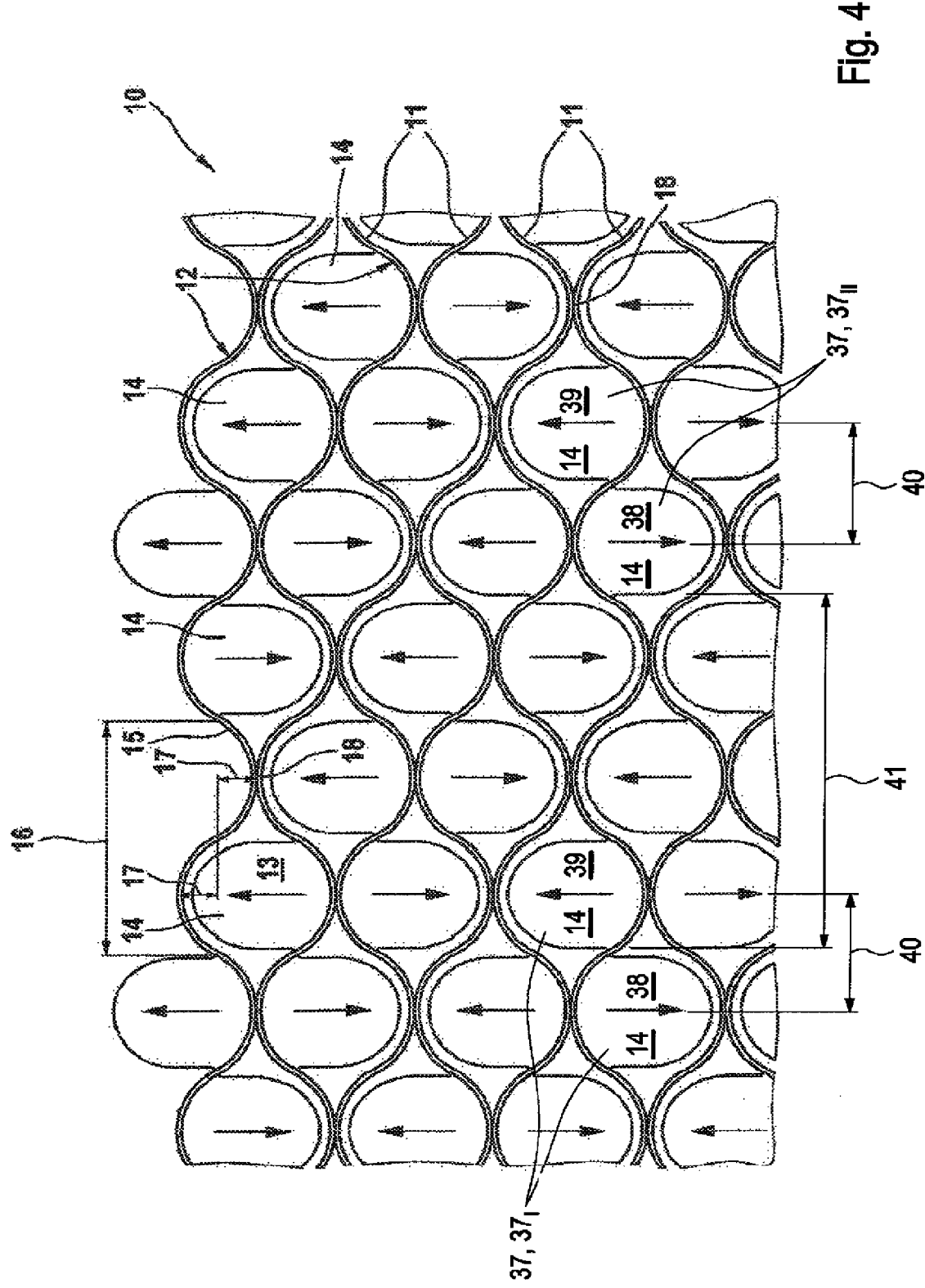
FIG. 4 is an enlarged detailed view in the direction of flow of the oncoming flow side of the mixer.
Figure 5:
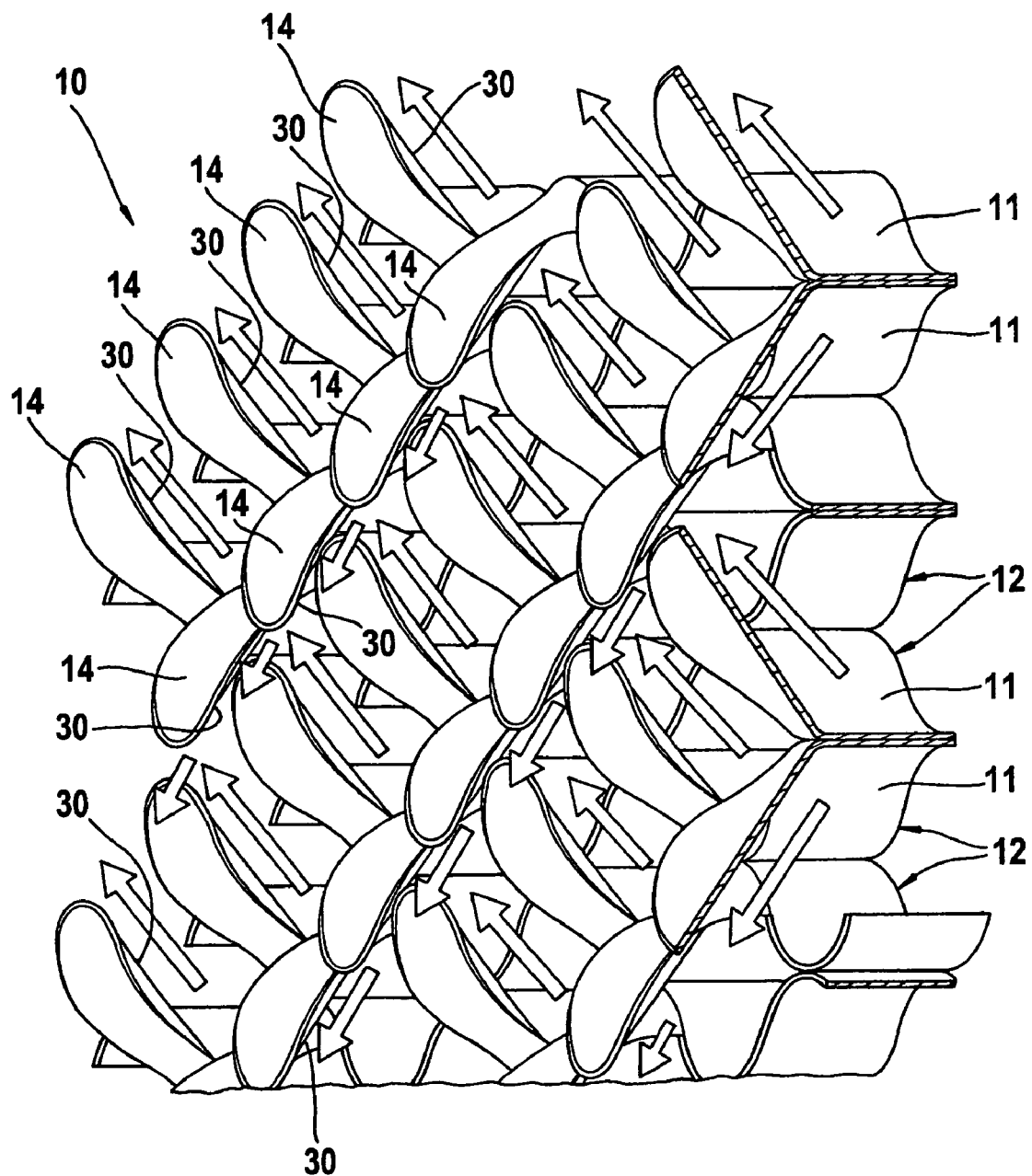
FIG. 5 is an enlarged perspective detailed view of the outgoing flow side of the mixer.

In the embodiment according to FIGS. 3 through 5, the baffles 14 which protrude away from the sheeting material 12 with the same orientations with regard to the direction of flow are spaced a distance apart from one another by precisely two wavelengths 16 along the sheeting material 12. In contrast with that, the baffles 14 which protrude away from the sheeting material 12 with opposite orientations with respect to the direction of flow are arranged so they are distributed along the sheeting material 12 so that they are spaced a distance of half a wavelength 16 apart in the direction of extent of the sheeting material 12 running across the direction of flow and are spaced a distance of three half-wavelengths 16 apart in the opposite direction of extent. For example, baffles 14 include a first exemplary pair $37_I$ of baffles and a second exemplary pair $37_{II}$ of baffles 14. A first baffle 38 of pair $37_I$ and a first baffle 38 of second pair $37_{II}$ are oriented in a downward direction with regard to the direction of flow, whereas a second baffle 39 of pair $37_I$ and a second baffle 39 of pair $37_{II}$ are oriented in an upward direction with regard to the direction of flow. Within first pair $37_I$, baffles 38 and 39 protrude away from the sheeting material 12 with opposite orientation with respect to the direction of flow and are spaced apart by a distance 40, which is equal to half a wavelength 16. Furthermore, first baffle 38 of first pair $37_I$ and first baffle 38 of second pair $37_{II}$ are spaced at a distance 41 which is equal to three half-wavelengths 16. Due to the targeted arrangement of the sheeting material 12 within the layers 11, it is possible to obtain the structure illustrated in FIGS. 3 through 5 in which the baffles 14 protrude away from the sheeting material 12 with opposing orientations with regard to the direction of flow with neighboring cells 13 formed between neighboring layers 11. The arrangement of the baffles 14 selected here yields an intense mixing effect.

Figure 8:
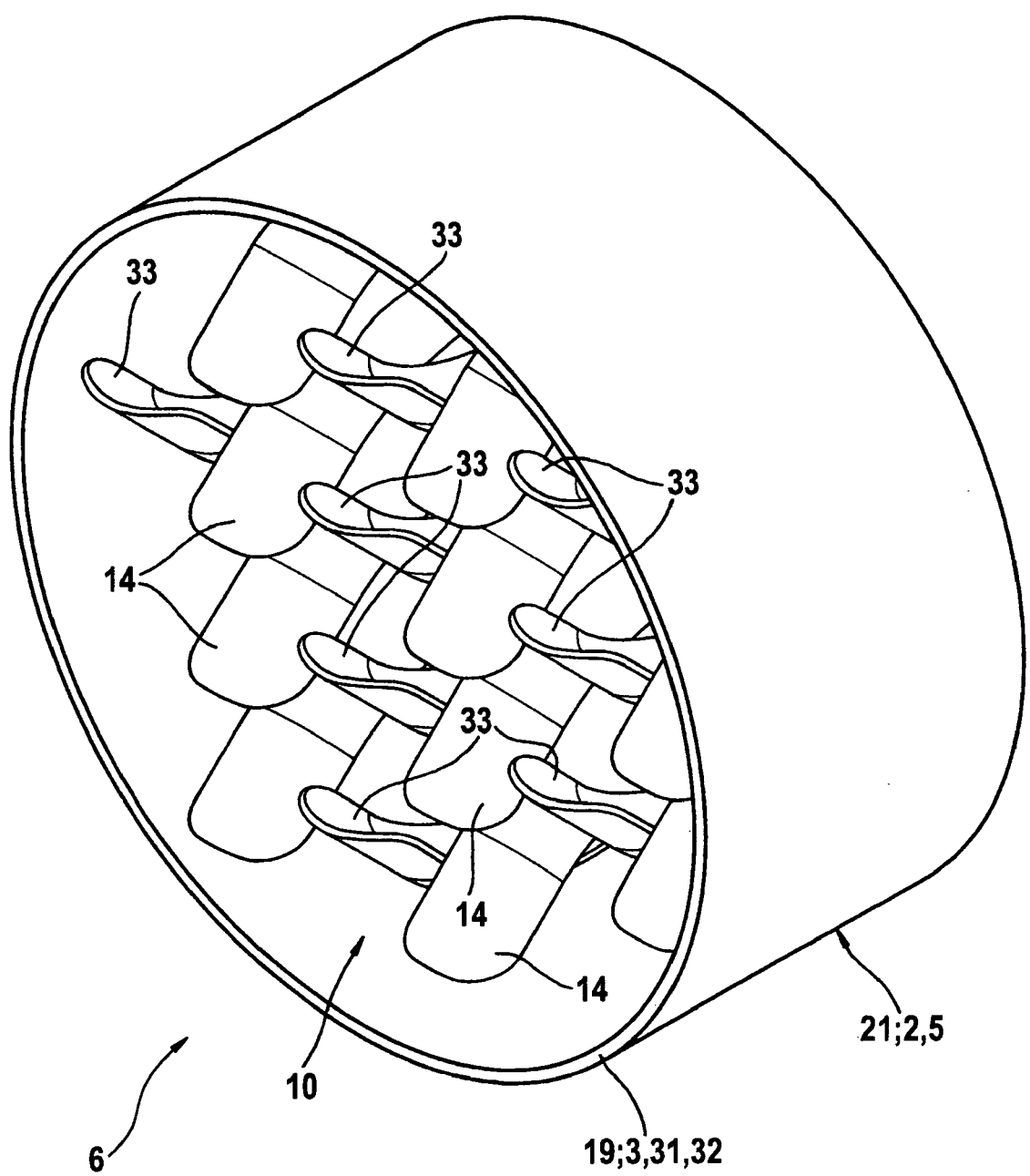
FIG. 8 is a perspective view of the embodiment according to FIG. 7.
Figure 9:
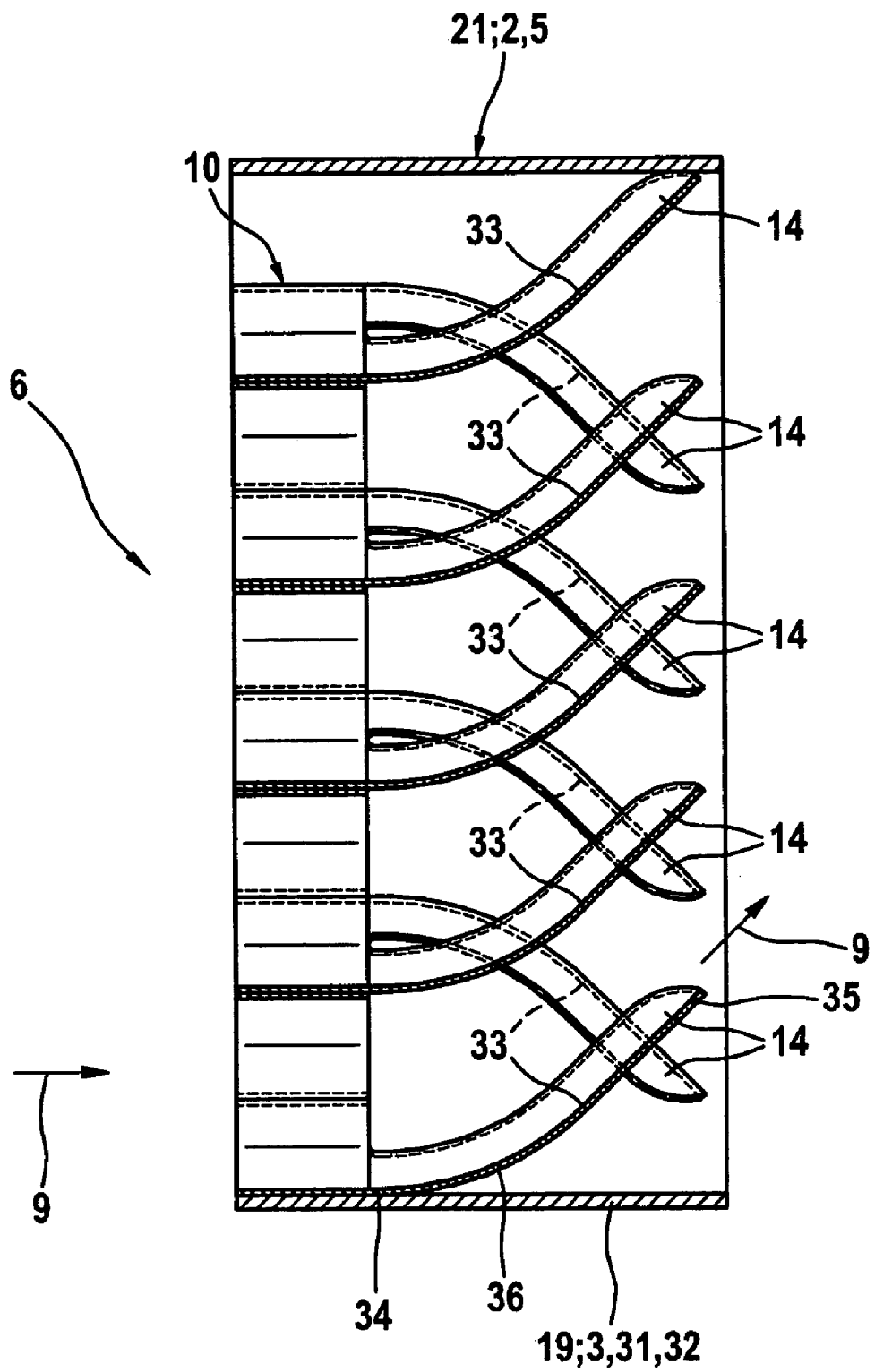
FIG. 9 is a longitudinal section of the mixer from FIG. 8.

In the embodiment illustrated in FIGS. 7 through 9, the baffles 14 which protrude away from the sheeting material 12 with the same orientation with regard to the direction of flow are spaced a distance apart from one another by exactly one wavelength 16 along the sheeting material 12. In contrast with that, the baffles 14 that protrude away from the sheeting material 12 with opposite orientations with regard to the direction of flow are arranged along the sheeting material and are distributed so that they follow one another directly in the direction of extent of the sheeting material 12 across the direction of flow, i.e., being a distance of half a wavelength 16 from one another.

In the embodiment illustrated in FIGS. 3 through 5, the sheeting material 12 is provided with the baffles 14 in each layer 11, so in the embodiment illustrated in FIGS. 7 and 8 the wall structure 10 is such that layers 11 with baffles 14 alternate with layers 11 without baffles 14. Layers 11 with baffles 14 are designated by reference numeral 11', whereas layers 11 without baffles 14 are designated by reference numeral 11".

In the embodiment illustrated in FIG. 7 through 9, the baffles 14 are arranged within the wall structure 10 with a distribution such that with neighboring cells 13 of neighboring layers 11 the baffles 14 protrude away from the sheeting material 12 with the same orientation with regard to the direction of flow. FIG. 7 shows accordingly a vertical alignment of the cells 13 with the baffles 14 oriented in the same direction.

In contrast with that, in the embodiment shown in FIGS. 3 through 5, the baffles 14 are distributed within the wall structure only in such a way that with neighboring cells 13 of neighboring layers 11 the baffles protrude away from the sheeting material 12 with the opposite orientation with regard to the direction of flow. Accordingly this yields a structure of the cells 13 running diagonally with baffles 14 oriented in the same direction.

To intensify the mixing effect and the vaporization effect of the mixer 6, the baffles 14 may also cumulatively or alternatively implement the following features. The baffles 14 may be angled by approximately 45° with respect to the direction of flow, alternately in one direction and in the other direction, as mentioned above. This is shown especially clearly in FIGS. 3, 5, 7 and 8.

In FIGS. 4 and 7 it can be seen that the baffles 14 are expediently of such dimensions and such an orientation with regard to the direction of flow which corresponds to the viewing direction in FIGS. 4 and 7 so that the individual cells 13 more or less overlap in the direction of flow and are therefore sealed in a more or less lightproof manner. For example, the baffles 14 achieve at least an 80% overlap or at least 90% overlap or at least a 95% overlap of the cells 13 in the direction of flow on the outgoing flow end, so the entire wall structure 10 is sealed at least 80%, 90% or 95% in the direction of flow to be lightproof.

Figure 6:
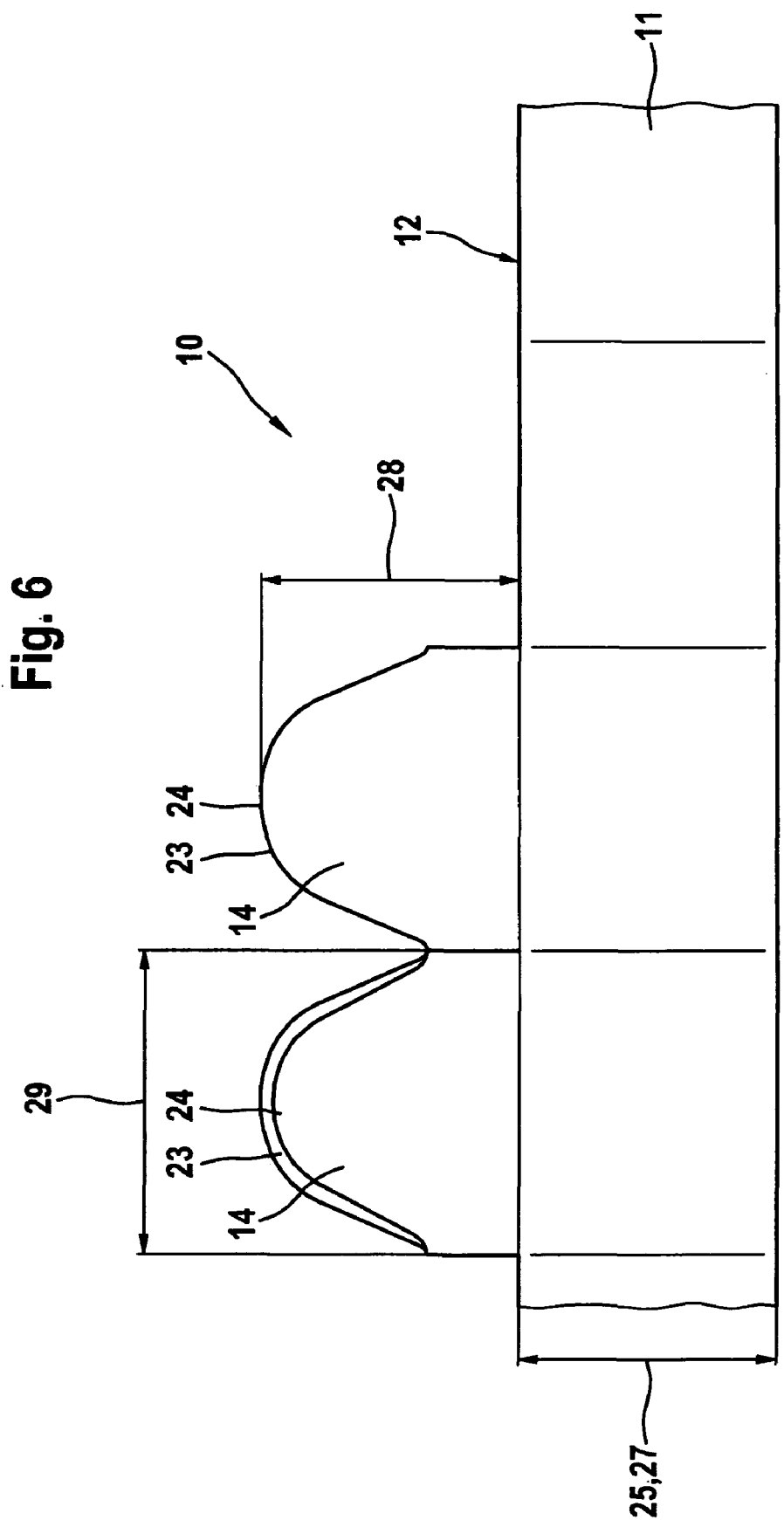
FIG. 6 is an enlarged view of a detail of the mixer across the direction of flow.

To improve the vaporization effect, the baffles 14 according to FIG. 6 may have a breakaway edge 24 on their respective outgoing flow end 23 or may be designed as such.

To implement a more compact design for the mixer 6, the sheeting material 12 may expediently be of such dimensions that in the individual cells 13, the diameter 26, measured across the direction of flow, may be greater than the length 27 measured in the direction of flow. The length 27 of the cells 13 corresponds to the width 25 of the sheeting material 12. In addition or as an alternative, according to FIG. 6, the longitudinal extent 28 of the respective baffle 14, as measured in the direction of flow, is approximately equal to the length 27 of the respective cell 13 measured in the direction of flow. In addition, the baffles 14 may each have a transverse extent 29 running across the direction of flow and being approximately equal to the diameter 26 of the respective cell 13 measured across the direction of flow. Essentially said transverse extent 29 corresponds to the respective baffle 14, in particular half the wavelength 16.

As FIG. 5 indicates, the baffles 14 may each have an oncoming flow side 30 having a convex curvature. In particular, said oncoming flow side 30 may have a saddle-shaped curvature. In contrast with that, the baffles 14 in the embodiment shown in FIG. 8 may have oncoming flow sides 33 having a concave curvature. In particular, these oncoming flow sites 33 may also have a saddle-shaped curvature.

FIG. 8 shows the preinstalled unit 21 which is equipped with the ring 19 and can be inserted as such into the respective pipe 3. Essentially FIG. 8 may also involve a detail of said pipe 3, i.e., a detail of the exhaust gas treatment device 2 and/or the exhaust system 5.

Steel or steel plate, preferably stainless steel, i.e., stainless steel plate is suitable as the material for the sheeting material 12 and optionally for the ring 19. Possible steel alloys include, for example, alloys having the following European Standard numbers or EN numbers: 1.4509, 1.4435, 1.4512, 1.4438, 1.4513, 1.4541, 1.4522, 1.4571, 1.4301 and 1.4828.

According to FIG. 9 the baffles 14 are preferably shaped in such a way that there is a steady transition to the direction of extent running across the direction of flow. The baffles 14 therefore have a rounded soft transition with the largest possible radius. This achieves the result that any increase in backpressure in deflection of the flow remains as small as possible. At the same time, voltage peaks in the wall structure 10 can be reduced and the development of kinks and breaks and the development of cracks in thermal shock stress can be avoided. In the case of the blade-like baffles 14, thus in particular an oncoming-flow-side section 34, which is connected directly to the wall structure 10 and/or to the sheeting material 12 and extends parallel to the oncoming exhaust gas flow 9 and in a straight line, it is thus possible to differentiate specifically a section 34 that is on the oncoming flow side and is connected directly to the wall structure 10 and/or to the sheeting material 12 and extends in a straight line parallel to the oncoming gas flow 9, a section 35 on the outgoing flow side, which defines an outgoing flow direction of the exhaust gas flow 9 and extends in a straight line and a curved central section 36, joining the two linear sections 34 and 35 together with a smooth transition.

The invention claimed is:

1. A static mixer for an exhaust system of an internal combustion engine, comprising: a wall structure arranged across the direction of flow in a pipe; a plurality of layers of a corrugated sheeting material situated one above the other in said wall structure; wherein said plurality of layers form a plurality of cells through which cells an exhaust flow passes; and a plurality of baffles arranged along the sheeting material and comprising baffle pairs, each baffle pair comprising a first and a second baffle, wherein for each said baffle pair, the first baffle is arranged at a distance of one half-wavelength relative to the second baffle, and wherein the second baffle of a first baffle pair is arranged at a distance of three half-wavelengths from the first baffle of a second baffle pair, and wherein at least one of said plurality of baffles is associated with at least one of said plurality of the cells, said at least one baffle being arranged on at least a first of said plurality of layers of sheeting material in such a way that it is arranged on the outgoing flow side of said cells and extends across the direction of flow.

2. The mixer according to claim 1, wherein said sheeting material is uniform in all layers and has corrugations of the same wavelength and the same amplitude.

3. The mixer according to claim 1, wherein a first and a second of said layers of corrugated sheeting material are so arranged that said first layer is offset by one half wavelength from said second layer.

4. The mixer according to claim 1, wherein said corrugated sheeting material has a sinusoidal or rectangular or trapezoidal shape.

5. The mixer according to claim 1, wherein said sheeting material extends without interruption over at least first and second of said layers and said first layer is bent or folded over into said second layer on the lateral end.

6. The mixer according to claim 1, wherein for each said baffle pair, said first baffle along the sheeting material protrudes away from the sheeting material in an orientation opposite to the orientation of said second baffle with regard to the direction of flow.

7. The mixer according to claim 1, wherein for said plurality of baffles, said first baffle of said first baffle pair protrudes away from said layer of sheeting material with the same orientation as the orientation of said first baffle of said second baffler pair with regard to the direction of flow, said first baffle of said first baffle pair and said first baffle of said second baffle pair being at a distance of two wavelengths apart from one another along the sheeting material.

8. The mixer according to claim 1, wherein first and second baffles associated with first and second of said plurality of cells protrude away from the sheeting material with opposite orientations with respect to the direction of flow.

9. The mixer according to claim 1, wherein first and second baffles associated with first and second of said plurality of cells protrude away from the sheeting material with the same orientation with respect to the direction of flow.

10. A static mixer for an exhaust system of an internal combustion engine, comprising: a wall structure arranged across the direction of flow in a pipe; a plurality of layers of a corrugated sheeting material situated one above the other in said wall structure; wherein said plurality of layers form a plurality of cells through which cells an exhaust flow passes; at least one baffle associated with at least one of said plurality of the cells, said at least one baffle being arranged on at least a first of said plurality of layers of sheeting material in such a way that it is arranged on the outgoing flow side of said cells and extends across the direction of flow, wherein said first of said plurality of layers with baffles and at least a second of said plurality of layers without baffles are alternately opposite one another within said wall structure.

11. The mixer according to claim 1, wherein said baffles are angled by approximately 45 degrees with respect to the direction of flow.

12. The mixer according to claim 10, wherein said baffles are integrally molded on said sheeting material.

13. The mixer according to claim 1, wherein said baffle is of such dimension and is oriented with respect to the direction of flow so that it overlaps and seals one of said plurality of cells by at least 80% to 95% in the direction of flow.

14. The mixer according to claim 1, wherein a diameter of one of said plurality of said cells measured across the direction of flow is larger than its length measured in the direction of flow.

15. The mixer according to claim 1, wherein said baffle has a breakaway edge on its respective outgoing flow end.

16. The mixer according to claim 1, wherein a longitudinal extent of said baffle measured in the direction of flow is approximately equal to the length of one of said plurality of cells measured in the direction of flow.

17. The mixer according to claim 1, wherein a transverse extent of said baffle measured across the direction of flow is approximately equal to a diameter of one of said plurality of cells measured across the direction of flow.

18. The mixer according to claim 1, wherein the at least one baffle has a convex or concave curvature, or a saddle-shaped curvature, on the oncoming flow side.

19. The mixer according to claim 1, wherein in the circumferential direction, said sheeting material is encompassed by a ring that is inserted into the pipe in the installed state of the mixer.

20. The mixer according to claim 19, wherein said sheeting material together with said ring forms a unit that can be preassembled and is arranged in the pipe in the installed state.

21. The mixer according to claim 19, wherein said sheeting material is attached to the pipe or said ring on lateral ends of at least one of said layers.

22. The mixer according to claim 1, wherein said sheeting material is arranged in loose contact between lateral ends of first and second of said plurality of layers.

23. An exhaust gas treatment device for an exhaust system of an internal combustion engine, comprising at least one exhaust gas treatment insert that is arranged in a tubular body of the exhaust gas treatment device; a mixer arranged in said tubular body upstream from said exhaust gas treatment insert, said tubular body of the exhaust gas treatment device forming a pipe; and an injection device for introducing a liquid upstream from the mixer, wherein said mixer comprises: a wall structure arranged across the direction of flow in the pipe; a plurality of layers of a corrugated sheeting material situated one above the other in said wall structure; wherein said plurality of layers form a plurality of cells through which cells an exhaust flow passes; and at least one baffle associated with at least one of said plurality of the cells, said at least one baffle being arranged on at least a first of said plurality of layers of sheeting material in such a way that it is arranged on the outgoing flow side of said cells and extends across the direction of flow, wherein a first of said plurality of layers with baffles and at least a second of said plurality of layers without baffles are alternately opposite one another within said wall structure.

24. The static mixer of claim 1, wherein the corrugated sheeting material extends across the direction of flow.

25. The static mixer of claim 1, wherein the corrugated sheeting material is corrugated wavelike.

* * * * *